United States Patent [19]

Kano et al.

[11] Patent Number: 4,745,819
[45] Date of Patent: May 24, 1988

[54] COMPACT POWER TRANSMISSION DEVICE FOR A FOUR-WHEEL DRIVE VEHICLE

[75] Inventors: Takenori Kano, Anjo; Mutsumi Kawamoto, Tokyo; Tatsuya Iwatsuki, Okazaki, all of Japan

[73] Assignee: Aisin-Warner Kabushiki Kaisha, Aichi, Japan

[21] Appl. No.: 948,217

[22] Filed: Dec. 31, 1986

[51] Int. Cl.[4] ............................................. F16H 37/10
[52] U.S. Cl. ................................ 74/701; 74/665 T; 74/694; 74/711; 180/249
[58] Field of Search ............. 74/665 GC, 665 T, 700, 74/701, 694, 710.5, 711, 713; 180/247, 248, 249, 250

[56] References Cited

U.S. PATENT DOCUMENTS

| | | | |
|---|---|---|---|
| 3,191,708 | 6/1965 | Simonds et al. | 74/665 T X |
| 3,439,785 | 4/1969 | Hughson | 74/710.5 X |
| 4,163,400 | 8/1979 | Fisher et al. | 74/710.5 X |
| 4,428,452 | 1/1984 | Muraoka et al. | 74/710.5 X |
| 4,476,953 | 10/1984 | Hiraiwa | 180/247 X |
| 4,520,690 | 6/1985 | Dangel | 180/249 X |
| 4,541,503 | 9/1985 | Akutagawa et al. | 180/249 |
| 4,582,160 | 4/1986 | Weismann et al. | 74/705 X |
| 4,602,526 | 7/1986 | Ashikawa | 74/701 |
| 4,643,045 | 2/1987 | Katayama | 180/249 X |

FOREIGN PATENT DOCUMENTS

| | | | |
|---|---|---|---|
| 224401 | 4/1959 | Australia | 74/711 |
| 81226 | 5/1984 | Japan | 180/248 |
| 135328 | 7/1985 | Japan | 180/248 |

Primary Examiner—Leslie A. Braun
Assistant Examiner—Dwight G. Diehl
Attorney, Agent, or Firm—Frank J. Jordan; C, Bruce Hamburg; Manabu Kanesaka

[57] ABSTRACT

A center differential gear adapted for use in a power transmission device for full-time type four-wheel drive vehicles includes a diff-carrier coupled with a power transmitting front casing covering the front diff-carrier of a front-wheel differential gear and arranged coaxially with the diff-carrier, a side gear coupled to the front wheels, and another side gear coupled to a gear mount casing which transmits power to the rear wheels. The diff-carrier of the center differential gear is supported between the side gear on the side driving the front-wheel differential gear and the gear mount casing in cantilever fasion. The other side gear is spline-coupled directly to the gear mount casing without passing through the diff-carrier.

4 Claims, 3 Drawing Sheets

COMPACT POWER TRANSMISSION DEVICE FOR A FOUR-WHEEL DRIVE VEHICLE

BACKGROUND OF THE INVENTION

The present invention relates to a power transmission device for four wheel drive vehicles, and particularly to an improvement in the structure of the center differential gear in a power transmission unit for full-time four wheel drive vehicles, which transmits rotation to both front and rear wheels at all times.

Heretofore, there have been proposed various kinds of power transmission devices for four wheel drive vehicles, which are obtained by slightly modifying the power transmission devices for transverse front engine front wheel drive vehicles.

In the above mentioned conventional devices, as shown in FIG. 3, drive power from the engine transmitted through a hollow shaft 45' to a differential gear carrier (diffcarrier) 41' which is rotatably supported on the shaft sections 42'a, 43'a of both side gears 42', 43' of the center differential gear 33', is distributed among both side gears 42', 43' from pinion 50' on the diff-carrier 41'. The drive power transmitted to the left hand side gear 42' is transmitted through another hollow shaft 46' to the front wheel differential gear (not shown) and distributed among side gears to be transmitted to the front axles on both sides (only the right front axle 31' is shown in FIG. 3.). The drive power transmitted to the right hand side gear 43' is transmitted through a ring gear mount casing 32' and a rear-wheel drive ring gear 35' to a gear 40' and then transmitted from a drive pinion-shaft 39' through a propeller shaft and a final speed reduction gear (not shown), to be distributed among the rear axles on both sides. Further, in the above-mentioned transmission of drive power, axial forces generated at side gears 42', 43' are transmitted respectively to the diff-carrier 41' and the ring gear mount casing 32' through thrust washers 51', 52', 53', 55' to be borne by the carrier 41' and the casing 32'.

The above-mentioned conventional power transmission device has a disadvantage in that, if the dimensions of the side gears 42', 43' are increased in order to withstand larger input torques, not only does the outer diameter of the diff-carrier 41' but also the diameters of the ring gear mount casing 32' and transfer casing 12' become larger, so much so that the transfer casing 12' can no longer be contained within the restricted space available behind the engine.

Accordingly, an object of the present invention is to provide an improved structure for a center differential gear in a power transmission device for a four-wheel drive vehicle, in which the diff-carrier is supported on the shaft section of the side gear on the front axle drive side and not on the shaft section of the other side gear transmitting power to the ring gear mount casing, thereby eliminating the above-mentioned problem and allowing the side gears to be of optimum size even within a confined space.

SUMMARY OF THE INVENTION

The present invention is devised in view of the above-mentioned circumstances, and accordingly provides a center differential gear wherein the diff-carrier, an extremity of which has an open end not to be supported by a side gear, is supported between a side gear on the front axle drive side and the gear mount casing, and another side gear transmitting power to the gear mount casing is spline-coupled directly to the gear mount casing.

With the above-mentioned arrangement, drive power transmitted to the diff-carrier from the engine is distributed from the pinion on the diff-carrier to one of the side gears coupled to the front wheel differential gear and to the other side gear coupled to the rear wheel side. The drive power transmitted to one of the side gears is transmitted to the front wheel differential gear where the drive power is distributed to rotate the front axles, while the drive power transmitted to the other side gear is transmitted through the gear mount casing directly coupled to said side gear and through a rear wheel drive ring gear to a drive pinion shaft and is then transmitted to the rear axles to rotate the rear wheels. During the drive power transmission, the axial force generated in the first of the above-mentioned side gears is borne by the diff-carrier and ring gear mount casing, while the axial force generated in the second of the above-mentioned side gears is directly borne by the gear mount casing.

DETAILED DESCRIPTION OF THE PREFERRED EMBODIMENTS

The present invention shall now be explained in one embodiment form with reference to the drawings.

Figure 2:
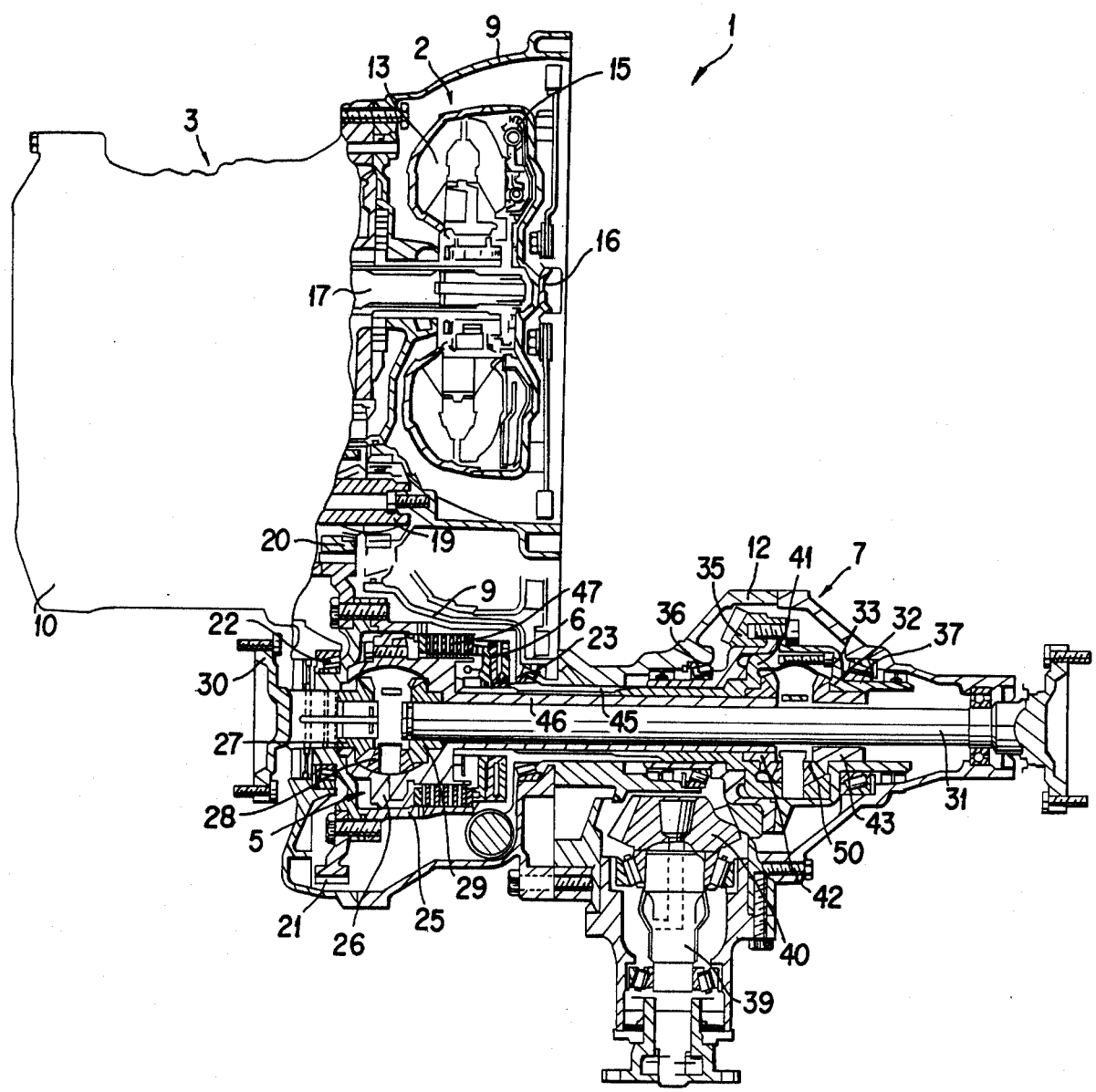
FIG. 2 is a cross-sectional view illustrating a power transmission device for a four wheel drive vehicle to which the present invention is applied.
Figure 3:
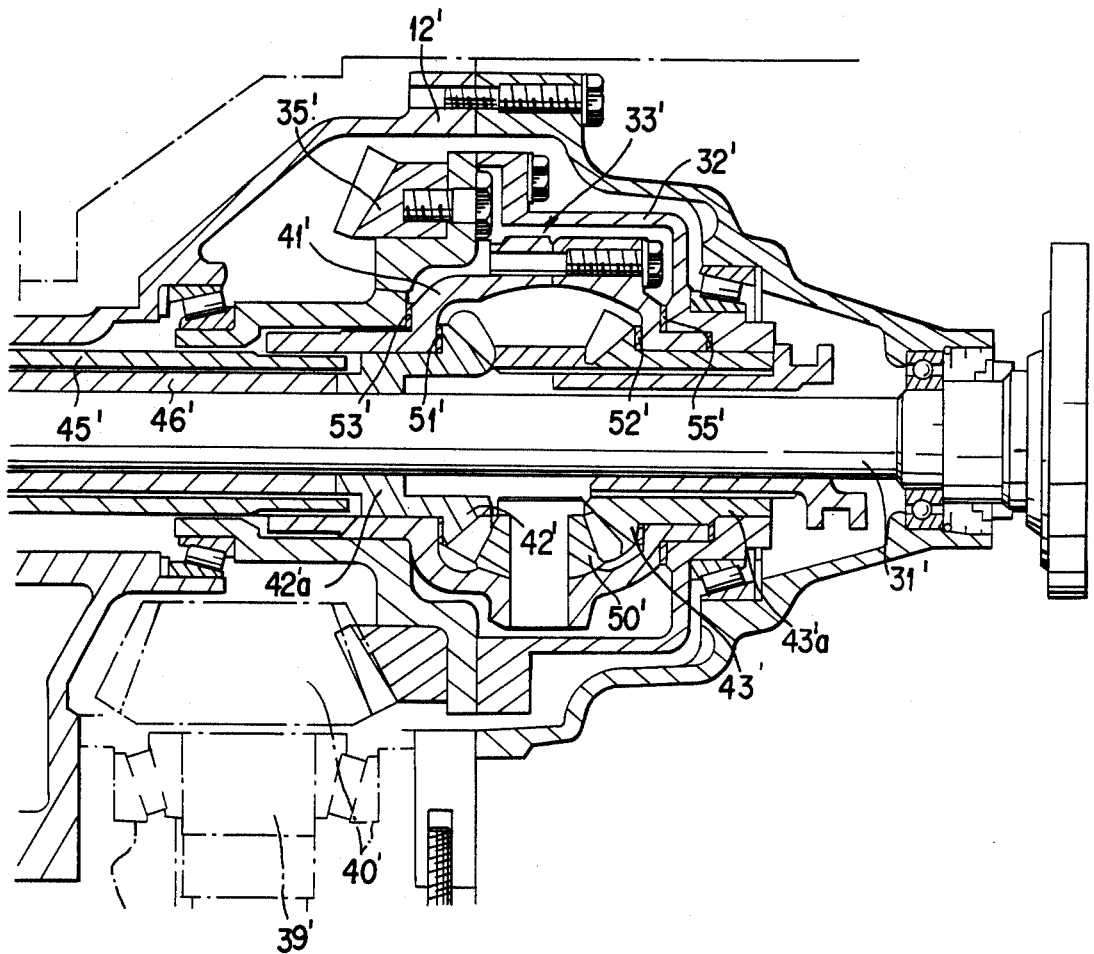
FIG. 3 is a cross-sectional view illustrating a transfer unit provided with a conventional center differential gear.

The power transmission device 1 for a full-time transverse front engine four wheel drive vehicle is provided, as shown in FIG. 2, with a torque converter unit 2, an automatic transmission 3, a front-wheel differential gear 5, a differential motion limiting mechanism 6 and a transfer unit 7, these being disposed in a trans-axle housing 9, a trans-axle casing 10 and a transfer casing 12 which are joined to each other. The torque converter unit 2 is composed of a torque converter 13 and a lock-up clutch 15, the rotation of an engine output shaft 16 being transmitted through them to an input shaft 17. The automatic transmission 3 is composed of a three stage planetary gear unit which is controlled by clutch or brake, the rotation of the input shaft 17 being subjected to speed reduction in any of the first, second, third overdrive and reverse gear stages and being transmitted to an output gear 20 rotatably supported on shaft 19.

The above-mentioned front wheel differential gear 5 is coaxially disposed on first ring gear 21 meshed with gear 20 and mount casing 25 to which the above-mentioned ring gear 21 is secured and which is supported by casings 10, 9 through tapered roller bearings 22, 23. A front diff-carrier 26 is rotatably incorporated in the mount casing 25, and side gears 27, 29 which are meshed with pinion 28 supported on the diff-carrier 26, are coupled to front axles 30, 31 so that power can be transmitted. A hydraulic multiple-disc clutch 47 constituting the differential motion limiting mechanism 6 is coaxially disposed between the ring gear mount casing 25 and the front diff-carrier 26.

The two piece transfer casing 12 is incorporated in the right side of the first ring gear mount casing 25 and front wheel differential gear 5 in the rear of the engine, and the transfer unit 7 is constituted within the transfer casing 12, coupled coaxially with the first ring gear mount casing 25 and the front-wheel differential gear 5. The transfer unit 7 includes a two piece second ring gear mount casing 32 which supports a rear wheel drive second ring gear 35 composed of a hypoid gear, and which is rotatably supported by the transfer casing 12 through a pair of tapered roller bearings 36, 37. The second ring gear 35 is always meshed with a gear 40 on drive pinion shaft 39, which is coupled to the rear axles through a known propeller shaft and a known rear wheel drive differential gear (not shown), so that power can be transmitted.

Figure 1:
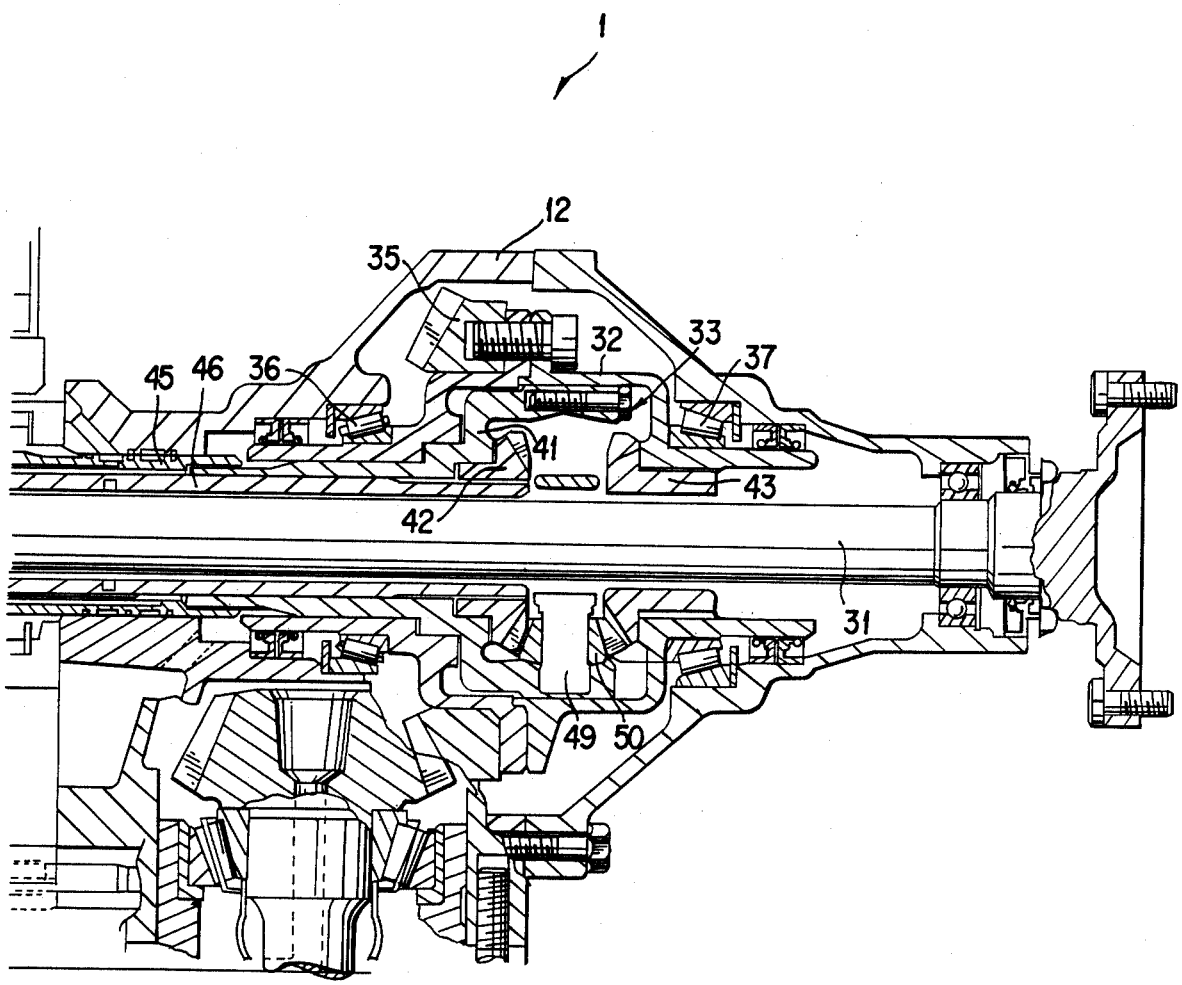
FIG. 1 is a cross-sectional view illustrating a transfer unit provided with a center differential gear according to the present invention.

A center differential gear 33 of the present power transmission device 1 comprises, as shown in FIG. 1, a diffcarrier 41 which rotatably supports pinion 50 through pinion shaft 49, and left and right hand side gears 42, 43 meshed with the pinion 50, the diff-carrier 41 having, an extremity of which has an open end not to be supported by the right hand side gear 43, such a cantilever structure that it is supported between the inside of the second ring gear mount casing 32 and the outside of the left hand side gear 42. The rotation of the first ring gear mount casing 25 is transmitted to the diff-carrier 41 through the first hollow shaft 45, and the second ring gear mount casing 32 is spline-coupled directly to the right hand side gear 43. The diff-carrier 41 is rotatably incorporated in the second ring gear mount casing 32, and the front axle 31 passes through both side gears 42, 43 and projects rightward from the right side end of the transfer casing 12. The left hand side gear 42 in the center differential gear 33 is coupled to the front diff-carrier 26 in the front wheel differential gear 5 by means of a second hollow shaft 46 which is spline-coupled with the left side end of the side gear 42 and rotatably fitted over the front axle 31, so that power can be transmitted. The first and second hollow shafts 45, 46 are attached integrally to the first gear mount casing 25 and the front diff-carrier 26, respectively, and the diffcarrier 41 is spline-coupled with the first hollow shaft 45 by press-fitting.

In the above-mentioned power transmission device 1, the first gear mount casing 25 is arranged to be engaged to and disengaged from the front diff-carrier 26 in the front differential gear 26 by means of the differential motion limiting mechanism 6. That is, when the hydraulic multiple-disc clutch 47 is actuated and the first ring gear casing 25 and the front diff-carrier 26 are integrally coupled with each other, the center differential gear 33 is inhibited from operating or is locked, and when the clutch is not actuated, relative rotation between side gears 42, 43 is allowed so that the center differential gear 33 is operational.

With the above-mentioned arrangement, the rotation of the engine is transmitted to the automatic transmission 3 through the torque converter 13 or the lock-up clutch 15, and is then transmitted from output gear 20 to the mount casing 25 through the first ring gear 21. The rotation is further transmitted to the diff-carrier 41 of the center differential gear 33 through the first hollow shaft 45, and is delivered from the pinion 50 on the pinion shaft 49 to side gears 42, 43. The drive power transmitted to the left hand side gear 42 is transmitted to the front-wheel differential gear 5 through the second hollow shaft 46 so that the front-wheel differential gear 5 distributes the drive power to both side gears 27, 29, thereby transmitting the drive power to both front axles 30, 31. Meanwhile, the drive power transmitted to the right hand side gear 43 is transmitted to the gear 40 through the second gear mount casing 32 and the rear wheel drive ring gear 35, and is distributed from the drive pinion shaft 39 to both rear axles through the propeller shaft and the rear-wheel differential gear, which are not shown.

As described above, according to the present invention, since the diff-carrier 41 in the center differential gear 33 is supported between the side gear 42 on the front axle drive side and the rear-wheel gear mount casing 32, an extremity of the diff-carrier 41 having an open end not to be supported by the side gear 43 and, the side gear 43, transmitting power to the mount casing 32 being coupled directly to the latter, the diff-carrier 41 can have a compact and lightweight structure with a smooth surface, and therefore, even if both side gears 42, 43 are designed to have sufficiently large dimensions in order to withstand the input torque, it allows the transfer casing 12 to be stored in a confined space in the rear section of the engine. Also, even with the above-mentioned modification to the power transmission device, a substantial part of the remaining component parts can be used in common with conventional power transmission devices, so that it is greatly advantageous in terms of the cost thereof. Further, as the axial force generated in the side gear 43 is borne directly by the mount casing 32, it is possible to eliminate the thrust washers necessary for smooth relative rotation between the side gears, the diff-carrier and the mount casing in conventional power transmission devices, thereby promoting a reduction in the number of necessary component parts.

What is claimed is:

1. A power transmission device for a four-wheel drive vehicle having a compact transfer unit including front wheel differential gear means, differential motion limiting mechanism means and center differential gear means, comprising;

a first gear mount casing having a gear adapted to mesh with an output of an automatic transmission;

a front wheel differential gear arranged in said first gear mount casing, and including a diff-carrier having a pinion adapted to mesh with right and left side gears coupled to right and left front axles;

a differential motion limiting mechanism arranged coaxially with said front wheel differential gear in said first gear mount casing, said differential motion limiting mechanism including a cluth for connecting or disconnecting said first gear mount casing and said diff-carrier;

a second gear mount casing disposed coaxially with respect to said first gear mount casing; and a center differential gear arranged in said second gear mount casing, and including a diff-carrier coupled with said first gear mount casing, a first side gear coupled with the diff-carrier of said front wheel differential gear, and a second side gear coupled with said second gear mount casing adapted for transmitting power to rear wheels of the four-wheel drive vehicle;

wherein the diff-carrier of said center differential gear is supported between said first side gear and said second gear mount casing and has an extremity having an open end not supported by said second side gear, and said second side gear is connected directly to said second gear mount casing.

2. A power transmission device for a four-wheel drive vehicle as set forth in claim 1,
wherein said diff-carrier of said center differential gear and the first gear mount casing are connected through a first hollow shaft, and said first side gear and said diff-carrier of said front wheel differential gear are coupled through a second hollow shaft located inside said first hollow shaft and fitted over a front axle extending from said front wheel differential gear.

3. A power transmission device for a four-wheel drive vehicle as set forth in claim 1,
wherein said differential motion limiting mechanism comprises a hydraulic friction clutch.

4. A power transmission device for a four-wheel drive vehicle as set forth in claim 1,
wherein said second gear mount casing includes a hypoid gear meshed with a rear wheel drive gear.

* * * * *